US010956309B2

(12) United States Patent
Koshelev

(10) Patent No.: US 10,956,309 B2
(45) Date of Patent: Mar. 23, 2021

(54) SOURCE CODE MANAGEMENT SYSTEMS AND METHODS

(71) Applicant: Atlassian Pty Ltd, Sydney (AU)

(72) Inventor: Artem Koshelev, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 16/145,210

(22) Filed: Sep. 28, 2018

(65) Prior Publication Data
US 2020/0104240 A1 Apr. 2, 2020

(51) Int. Cl.
G06F 9/44 (2018.01)
G06F 11/36 (2006.01)
G06F 8/71 (2018.01)

(52) U.S. Cl.
CPC ............ *G06F 11/3676* (2013.01); *G06F 8/71* (2013.01); *G06F 11/3688* (2013.01); *G06F 11/3692* (2013.01)

(58) Field of Classification Search
CPC .......... G06F 11/3676; G06F 8/75; G06F 8/70; G06F 11/3692; G06F 8/71; G06F 11/3688
See application file for complete search history.

(56) References Cited

U.S. PATENT DOCUMENTS

| | | | | |
|---|---|---|---|---|
| 6,536,036 B1* | 3/2003 | Pavela | ................ | G06F 11/3676 707/999.104 |
| 9,292,419 B1* | 3/2016 | Kintali | ................ | G06F 11/3676 |
| 2003/0093716 A1* | 5/2003 | Farchi | ................ | G06F 11/3676 714/34 |
| 2008/0307391 A1* | 12/2008 | Goel | .................... | G06F 11/3676 717/115 |
| 2009/0144698 A1* | 6/2009 | Fanning | .................... | G06F 8/75 717/120 |
| 2011/0047532 A1* | 2/2011 | Wang | .................. | G06F 11/3676 717/130 |
| 2013/0091492 A1* | 4/2013 | Mizrahi | .............. | G06F 11/3676 717/124 |
| 2013/0227515 A1* | 8/2013 | Suresh | ...................... | G06F 8/70 717/100 |
| 2016/0299835 A1* | 10/2016 | Jain | ..................... | G06F 11/3676 |

(Continued)

OTHER PUBLICATIONS

Wong-Mozqueda et al., "Is Code Quality Related to Test Coverage?",International Workshop on Sustainable Software Systems Engineering dated Jan. 2015, 2 pages.

(Continued)

*Primary Examiner* — Tuan A Vu
(74) *Attorney, Agent, or Firm* — Brownstein Hyatt Farber Schreck, LLP

(57) ABSTRACT

Described herein is a computer implemented method comprising accessing code coverage information, the code coverage information describing units of a particular version of a particular source code base and, for each unit, a code coverage status indicating whether the test suite covered, did not cover, or partially covered the unit. The code coverage information is then associated with the relevant source code by, for each unit described in the code coverage information, identifying the corresponding unit in the source code and associating the code coverage status as described in the code coverage information with the corresponding unit identified.

19 Claims, 4 Drawing Sheets

(56) References Cited

U.S. PATENT DOCUMENTS

2018/0101468 A1* 4/2018 Tzabari .................. G06F 8/75

OTHER PUBLICATIONS

Marinescu et al., "COVRIG: A Framework for the Analysis of Code, Test, and Coverage Evolution in Real Software", ISSTA dated Jul. 2014, 12 pages.

Kochhar et al., "Code Coverage and Postrelease Defects: A Large-Scale Study on Open Source Projects", HAL Archives Ouvertes, dated Dec. 2017, 17 pages.

Kochhar et al., "An Empirical Study on the Adequacy of Testing in Open Source Projects", dated 2014, 8 pages.

* cited by examiner

SOURCE CODE MANAGEMENT SYSTEMS AND METHODS

TECHNICAL FIELD

The present disclosure is directed to source code management systems and methods.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In computer software development, source code management systems (also called revision control or version control systems) are used to track and manage computer program source code as the code is written and revised. For readability, the acronym "SCM" will be used herein in place of "source code management".

Generally speaking, SCM systems store data—typically source code—in repositories and facilitate access to that data from multiple different client systems. In order to work on a project, a user (using a client system) creates a local copy of the relevant data (e.g. the program source code files) from a repository and works on their local copy. If the user makes changes that are to be incorporated into the remote version of the data, the user's local copy of the data—or at least those portions that have been changed—is written back to the repository using the SCM system. The SCM system controls access to the repository data and also manages version control for the data.

SUMMARY

The appended claims may serve as a summary of the invention.

Figure 1:
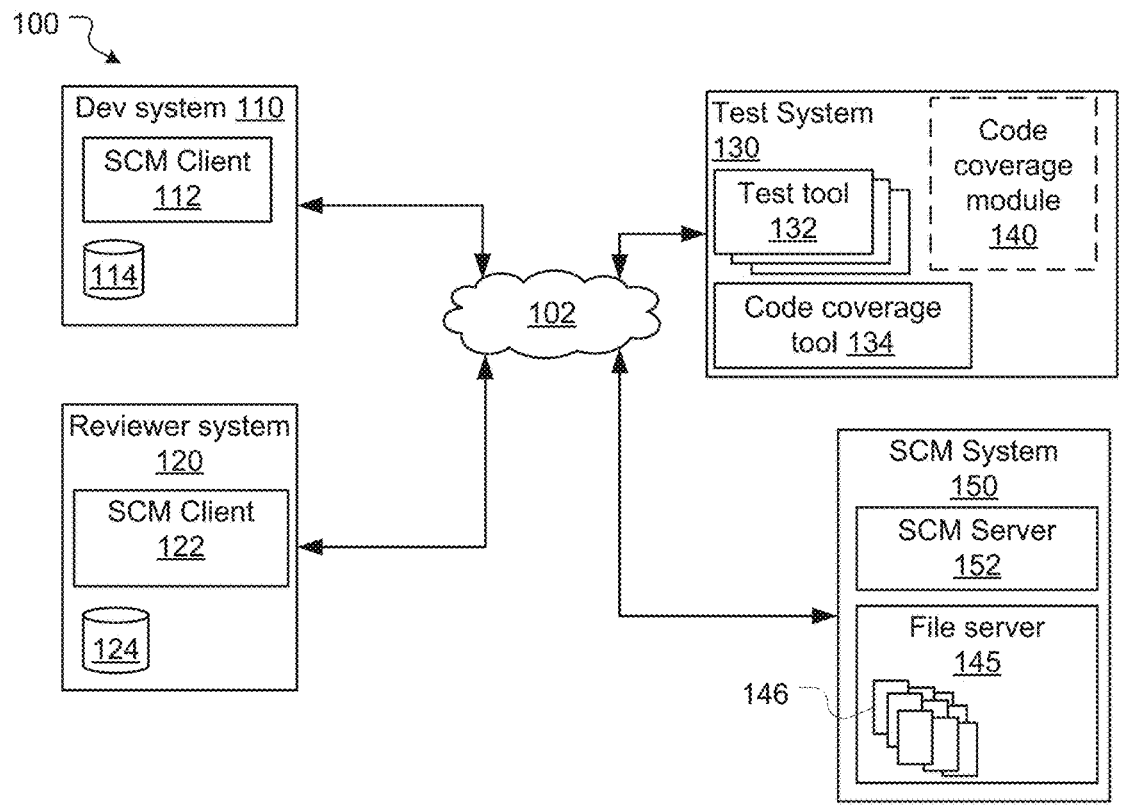
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

In this description, embodiments and features thereof will predominantly be described with reference to Bitbucket SCM system (commercially available from Atlassian) and using Bitbucket's associated nomenclature. While Bitbucket will be referred to as a SCM system, Bitbucket (And similar tools) is a software product that provides (amongst other things) a front end to an underlying SCM system (e.g. Git). The embodiments and features are not, however, limited to Bitbucket, and could well be applied to various front end systems (such as Gitweb, wit, cgit, GitLab, GitHub, gitorious, Trac, Kallithea, Springloops, Bonobo Git Server) based on various SCM systems (e.g. Git, Subversion, Source Control).

As discussed above, SCM system operations include reviewing source code, amending/making changes to source code, and integrating source code changes into a main code base. The integration of source code changes into a main code base is often a critically important operation.

While various workflows are used to manage software development, a common work flow involves a developer creating a local copy (e.g. a branch) of the main code base. The developer then works on the branch on to make changes to the source code to implement a particular change—e.g. a bug-fix, the addition of a new feature, or another change. When the developer is happy with the changes, the revised source code then needs to be merged back into the main code base (e.g. the master branch or trunk). To do this the developer creates a pull request (sometimes called a merge request), which indicates that they think the changes are ready to be pulled or merged back into the main code base (e.g. the master branch/mainline/trunk). The pull request triggers quality assurance processes which involve review of the code (and, potentially, any test results). If the changes to the code pass the relevant quality assurance processes the changes are merged back into the master branch.

For ease of reference, as used herein developers refers to users who are in the role of developing a code base, for example working on a branch to implement a new feature, bug fix, or other change. Reviewers are users who are in the role of reviewing proposed changes to the code base once a pull request has been made. These are, of course, roles with associated permissions/parts to play in the software development process. Any given user could well act in both a developer and reviewer role.

At various stages in this process developers and/or reviewers may wish to compare different source code versions. For example, when processing a pull request a reviewer may want to look at the actual changes that have been made to the source code. In order to do this, many SCM systems provide a diff functionality which allows two versions of source code (e.g. an original version and a revised version) to be compared to determine the differences: e.g. what lines of source code have been added, what lines of source code have been removed, and what lines of source code remain the same.

A developer may take advantage of the diff functionality, for example to remind themselves of the starting point of the code they are working on (the original version) and the changes they have made (the revised version). A developer may also use the diff function of the SCM before creating a pull request in order to check that while they were working on their own branch no other changes were made to the main code base (e.g. the master branch) that need to be accounted for.

Reviewers may also make use of the SCM system diff function when handling a pull request. As discussed above, merging/reintegrating code into the main code base/master branch is often a critical process. Furthermore, as continuous integration software development methodologies become more and more commonplace, the frequency of pull requests is increasing. Where continuous integration methodologies are being used, pull requests can occur several times a day (even on a single project) and there is a general expectation that they will be dealt with quickly so that integration of the code changes into the main code branch is not delayed. Given this, improving the information available to reviewers involved in reviewing pull requests can provide significant advantages.

One particular area in which SCM systems can be improved is the manner in which code coverage (sometimes referred to as test coverage) results are made available so they can be efficiently analysed and taken into account when needed. This may be of use to developers reviewing changes they have made to the code (either in a final view or diff view), or to reviewers, for example when processing pull requests and deciding whether or not the source code to which the pull request applies is ready to be integrated into the master branch.

Code coverage tools are one type of tool available to assist with the quality assurance process. Examples of code coverage tools include Istanbul, Cobertura, JCov, JaCoCo, Clover, OpenClover, EMMA, Jtest, Serenity, Testwell. Generally speaking, a code coverage tool operates to determine the coverage of a particular test suite (i.e. one or more tests that are performed on the code base) with respect to a source code base. Code coverage tools typically report on whether a given part of a source code base has been: covered by the test suite in question; not covered by the test suite in question; partially covered by the test suite in question (e.g. conditional logic statements where the test suite has covered some but not all of the available options).

Different code coverage tools may analyze and report on different source code 'units'. Typically, source code 'units' are source code lines, however, 'units' reported on by a given code coverage tool could alternatively be source code functions or subroutines, source code statements, source code branches, source code conditions.

The embodiments described herein operate to improve SCM systems by processing raw test results generated by a code coverage tool to generate code coverage information, and associating that code coverage information with the corresponding source code in the SCM system. The embodiments further provide improved user interfaces in which a user can review both source code and associated code coverage information at the same time. This provides a richer and more useful set of data to the reviewer and alleviates the requirement for the user to continually switch back and forth between their SCM system interface (in which the source code is being reviewed) and their code coverage tool interface (which provides the raw code coverage test results).

An overview of one example environment illustrating different systems involved in certain embodiments will be described, followed by a description of a computer system which can be configured in various ways to perform various features of the embodiments described herein. Operations for processing code coverage test results and associating the resulting information with the relevant source code in the SCM system will then be described, followed by the generation of user interfaces that display both source code and code coverage information.

Environment Overview

FIG. 1 illustrates an example environment 100 in which embodiments and features of the present disclosure are implemented. Example environment 100 includes a communications network 102 which interconnects a developer system 110, a reviewer system 120, a test system 130, a code coverage module 130, and a SCM system 150.

Developer system 110 and reviewer system 120 are configured in a similar (or even the same) manner. Both systems have a SCM client 112/122 installed thereon which, when executed by a processor of the client system 110/120, configures the system 110/120 to perform various client-side SCM functions. By way of example, some functions performed by the SCM client 112/122 include creating local repositories; modifying, adding or deleting files in the local repositories; committing/pushing changes made in the local repository to the SCM system 150 (so that the files are written to the relevant SCM repository 146 in the shared file server 154); fetching (e.g. pulling) files from the shared file server 154 (via SCM system 150); providing a user interface for reading/writing source code; providing diff functionality to allow a developer to compare different source code versions; making pull requests; processing pull requests (approving/declining) etc. Both the developer and reviewer systems 120 also have locally accessible memory 114/124 which can be used, inter alia, or storing local (working) copies of source code repositories maintained by the SCM system 150.

Developer system 110 and reviewer system 120 are typically personal computing devices—e.g. desktop computers, laptop computers, tablet computers, and in some instance even mobile phones. While a single developer system 110 and a single reviewer system 120 have been illustrated, an environment would typically include multiple developer systems 110 and multiple reviewer systems 120. Furthermore, while the developer system(s) 110 and reviewer system(s) 120 have been illustrated as distinct systems it is again noted that developer and reviewer are simply roles: it is entirely possible (and quite normal) for a single user system to be configured for both developer system functionality (for when the system user is acting as a developer) and review system functionality (for when the system user is acting as a reviewer).

In the present example, environment 100 includes a separate test system 130. Test system 130 provides various test tools 132 for performing various types of tests. One particular test tool provided by system 130 is a code coverage tool 134 for performing code coverage tests. Code coverage tool 134 may, for example, be Istanbul, Cobertura, JCoCo, or another code coverage tool.

In alternative embodiments, instead of a separate test system 130, testing may be performed by other systems. For example, test tools (including a code coverage tool) may installed directly on the reviewer and/or developer systems 110/120 and all testing performed locally on those systems.

Code coverage module 140 operates to access and process raw code coverage test results (generated by code coverage tool 134) to generate code coverage information which is then communicated to and used by the SCM system 150. Code coverage module 140 is a programmatic module, and is shown in broken line to indicate that it may be installed (and its functions performed) by any appropriate system. In the present embodiment, the code coverage module is part of the test system 130. The test system 130 may, in turn, be (or be part of) a continuous integration system, in which case testing (including code coverage testing) is automatically triggered by changes made to a code base at the SCM system. In alternative embodiments, the code coverage module could be installed on an alternative system, for example a dedicated system or another of the systems already present in environment 100—e.g. reviewer system 120, developer system 110, or SCM system 150.

The SCM system 150 includes one or more SCM servers 152 and file server 154. The one or more SCM servers 152 receive/respond to requests from SCM clients (e.g. client 112 and client 122) and communicate with the file server to retrieve/store data. In certain embodiments, the SCM system 150 is a scalable system including multiple distributed server nodes connected to the shared file server 154. Depending on demand from client devices (and/or other performance requirements), SCM server nodes can be provisioned/de-provisioned on demand to increase/decrease the number of servers offered by the SCM system 150. Each SCM server 152 may run on a computer system and includes one or more application programs, libraries, APIs or other software that implement server-side functionality.

The SCM system 150 stores source code repositories 146 on the shared file server 154 and manages the content of those SCM repositories 112. Each SCM repository 112 may include various files (e.g. source code files) and associated file and/or repository metadata—e.g. code coverage results. Shared file server 154 may be a distributed system storing content over multiple shared file server nodes which can be provisioned/de-provisioned on demand based on the data storage requirements.

Communications between the various systems in environment 100 are via the communications network 102. For example, in certain embodiments the developer and reviewer systems 110 and 120 may communicate with the SCM system 150 through a local area network (LAN) of an enterprise. In this case the SCM system 150 is implemented as an internal solution in which the SCM system 150 and developer/reviewer systems 110/120 are associated with the same business enterprise. In other embodiments, the network 102 may be a public network (e.g. the Internet) and the SCM system 150 may be located in a shared data center or cloud computing facility. Further, the communication between systems may be facilitated by any appropriate transport protocol. For example, a Git-based SCM system supports secure shell (SSH), Hypertext Transfer Protocol (HTTP), Hypertext Transfer Protocol Secure (HTTPS), and Git transport protocols.

While environment 100 has been provided as an example, alternative system environments/architectures are possible.

Hardware Overview

The embodiments and features described herein are implemented by one or more special-purpose computing systems or devices. For example, in environment 100 each of the developer system 110, reviewer system 120, test system 130, and SCM system 150 are a type of computing system.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
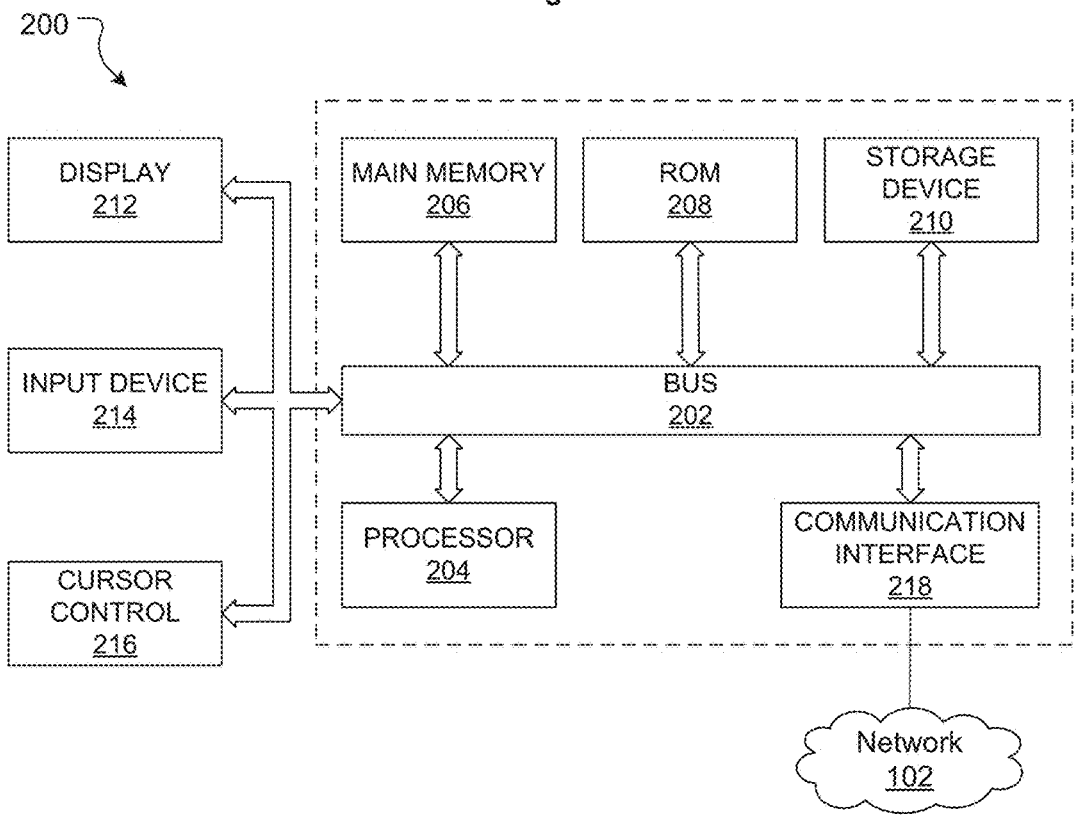
FIG. 2 is a block diagram of a computing system with which various embodiments of the present disclosure may be implemented.

By way of example, FIG. 2 provides a block diagram that illustrates one example of a computer system 200 which may be configured to implement the embodiments and features described herein. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a communication network, for example communication network 102 of environment 100. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218.

As noted, computer system 200 may be configured in a plurality of useful arrangements, and while the general architecture of system 200 may be the same regardless of arrangements there will be differences. For example, where computer system 200 is configured as a server computer (e.g. such as test system 130 or SCM system 150), it will typically be provided with higher end hardware allowing it to process data, access memory, and perform network communications more rapidly than, for example, an end user computing system (such as developer/reviewer systems 110/120).

Generating Code Coverage Information and Associating it with Source Code

This section describes the processing of raw code coverage test results and associating the resulting code coverage information with source code in the SCM 150.

Figure 3:
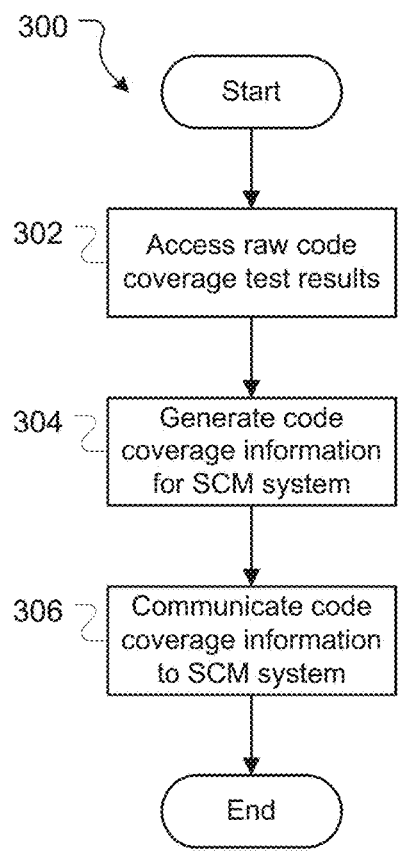
FIG. 3 is a flowchart indicating operations performed to generate code coverage information from raw code coverage test results.

FIG. 3 provides a flowchart illustrating operations 300 performed by the code coverage module 140 to process raw code coverage test results and communicate the resultant information to the SCM system 150.

At 302, the code coverage module 140 accesses raw code coverage test results.

The raw code coverage test results are results of a code coverage test performed by a code coverage tool 134 on: a specific source code base (i.e. one or more source code files); a specific version of that specific source code base; and a specific test suite (which may involve one or more tests). The specific source code file(s) and version may be identified by a SCM system identifier for those files—e.g. a commit identifier or the like.

At 304, the code coverage module 140 processes the raw code coverage test results to extract/generate code coverage information that is to be communicated to (and used by) the SCM 150.

The precise processing of the raw code coverage test results will depend on both the specific code coverage tool 134 in question (which defines the information included in and format of the raw test results) and the SCM system 150 in question (which will define the required code coverage information and format thereof). Generally speaking, however, the code coverage module 140 processes the raw code coverage test results to extract or generate code coverage information that includes, inter alia, information on lines (or other units) of the source code that was the subject of the test (identified, for example, by a combination of the particular source code file in question and the specific line of that file). The information indicates of whether a given source code line (or other unit) was covered by the test suite used, was not covered by the test suite used, or was partially covered by the test suite used. This processing will generally be received by iterating through the raw code coverage results to identify each source code file in question, and for each source code file iterating through the units of the source code file (e.g. source code lines) to extracting the coverage data in respect thereof.

For example, an extract of the raw code coverage results generated by Jacoco is shown in table A:

TABLE A

Example JSON schema for code coverage information

Various header and other code coverage data
<sourcefile name ="test.txt">
  <line nr="1" mi="0" ci="1" mb="0" cb="0"/>
  <line nr="2" mi="0" ci="1" mb="0" cb="0"/>
  <line nr="3" mi="0" ci="1" mb="0" cb="0"/>
  <line nr="4" mi="0" ci="1" mb="0" cb="0"/>
  <line nr="5" mi="0" ci="1" mb="0" cb="0"/>
  <line nr="6" mi="0" ci="5" mb="2" cb="2"/>
  <line nr="7" mi="0" ci="5" mb="2" cb="2"/>
  <line nr="8" mi="0" ci="5" mb="2" cb="2"/>
  <line nr="9" mi="1" ci="0" mb="0" cb="0"/>
<sourcefile name ="xxx.txt">
...

These raw code coverage results are processed to identify source code lines that are covered, partially covered, and not covered. By way of specific example, processing the raw code coverage test results at 304 may result in the generation of JSON file having the following format:

TABLE B

Example JSON schema for code coverage information

```
{
  "files": [
    {
      "path": "test.txt",
      "coverage": "C:1,2,3,4,5;P:6,7,8;U:9"
    }
```

TABLE B-continued

Example JSON schema for code coverage information

```
    ]
}
```

In this example, the code coverage information is provided in a JSON object that includes an array of source code file objects (in this case the array has a single element relating to the "test.txt" source code file). Each object in the array includes path information (e.g. the source code file name) and coverage information (indicating the code coverage for the file indicated by the path). In this case the code coverage information is a string which uses the label "C" to indicate covered lines (e.g. lines 1, 2, 3, 4, and 5 in the example), "P" to indicate partially covered lines (e.g. lines 6, 7, and 8 in the example), and "U" to indicate "uncovered" lines (e.g. line 9 in the example).

More generally, the code coverage information of this embodiment includes one or more file elements. Each file element is in respect of a corresponding source code file and includes file identification information and code coverage information in respect of the corresponding source code file.

At 306, the code coverage module 140 communicates the code coverage information generated at 304 to the SCM system 150. Where the code coverage module 140 is operating on a system other than the SCM system (e.g. reviewer system 120), the code coverage information is communicated to the SCM system 150 via the communications network 102. Where the code coverage module 140 is operating on the SCM system 150 itself, communication of the code coverage information to the appropriate module/process of the SCM system 150 is handled programmatically. In either case, the code coverage module 140 provides the code coverage information to the SCM system 150 with source code base information that identifies the particular source code base, and particular version thereof, that the code coverage information applies to.

The code coverage information is communicated to the SCM system with code base identifier allowing the particular version of the particular source code base to be identified. In certain embodiments the code base identification information is a SCM system commit identifier in respect of the particular version of the source code base.

The code base identifier may be communicated to the SCM system in various ways. In certain embodiments, the code base identifier is included as part of a REST call made to the SCM system, for example: "http://localhost:7990/bitbucket/rest/code-coverage/1.0/commits/[commit identified]". In alternative embodiments the code base identifier may be included as part of the code coverage information itself (e.g. as an element of the JSON object described above).

In certain cases, multiple sets of code coverage information may associated with the same commit identifier. In this case, the results are merged at the server.

Figure 4:
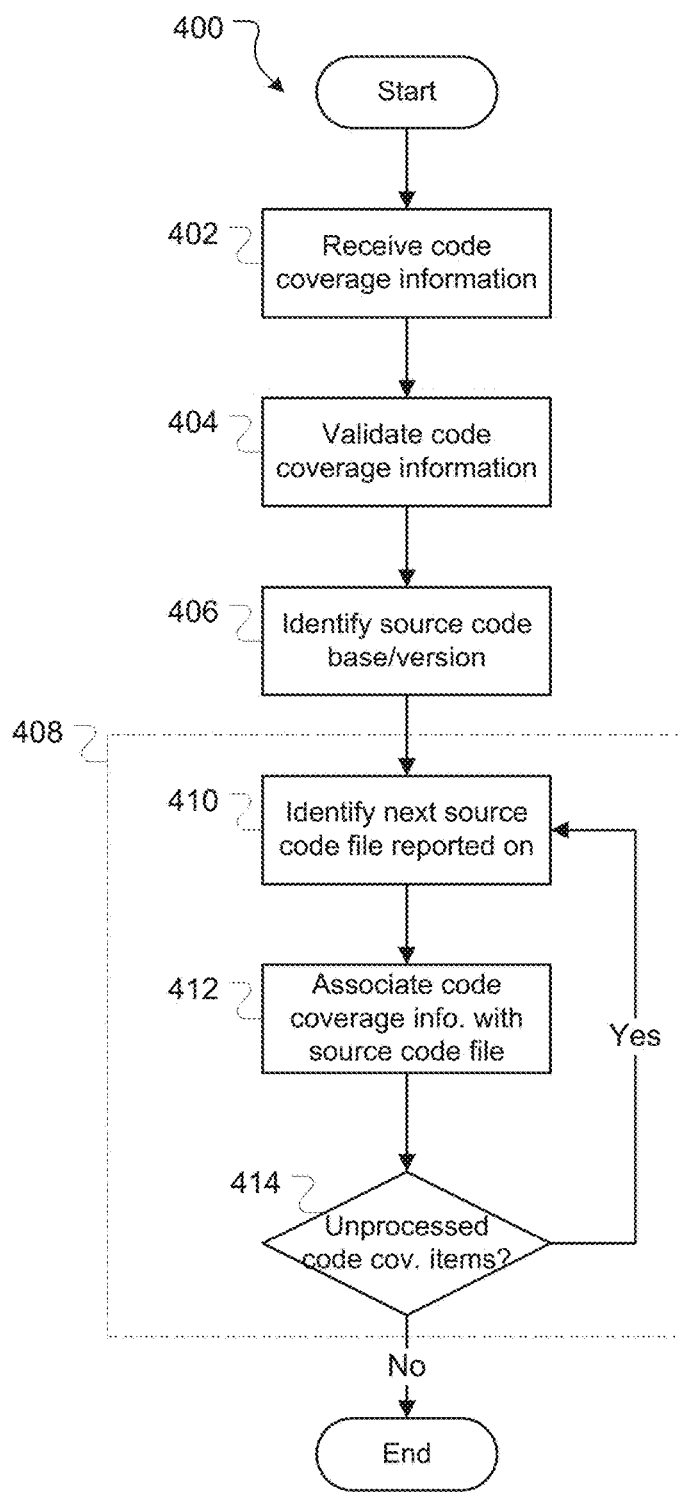
FIG. 4 is a flowchart indicating operations performed to associate code coverage information with source code in a SCM system.

Turning to FIG. 4, a flowchart illustrating operations 400 performed by the SCM system 150 to associate code coverage information received from the code coverage module 140 with the relevant source code base will be described.

At 402, the SCM system 150 receives code coverage information from the code coverage module 140.

At 404, the SCM system 150 validates the format of the code coverage information. If the format is not as expected, an appropriate error message is generated.

At 406, the SCM system 150 identifies the source code base—and particular version thereof—to which the received code coverage information pertains. Continuing the above example, this may be by a commit identifier received in or with the code coverage information.

At 408, the SCM system 150 processes the code coverage information to associate it with the source code base in question.

The precise processing and association performed here will depend on the SCM system 150 in question and how it identifies/stores source code files. In the present embodiment, however, association of the code coverage information with the relevant source code base is achieved as follows.

At 410, the next unprocessed source code file reported on in the code coverage information is identified.

At 412, the code coverage information in respect of the source code file is saved by the SCM system 150 into a code coverage table associated with the source code file. Where code coverage results for the source code file exist, the new code coverage information is merged with the existing code coverage information.

At 414, the source code system 150 determines whether there are any unprocessed source code files reported on in the code coverage information. If so, processing returns to 410. If not, processing is complete.

When a pull request with respect to the code base is received, the SCM system 150 checks whether there is any code coverage information in the table and serves this with the source code base as part of the response to the pull request.

In certain embodiments, the SCM system 150 may store the code coverage information until (and if) it is manually deleted by a user. In other embodiments, the SCM system 150 may automatically delete the code coverage information on occurrence of a specified event or condition occurring. For example, code coverage information in respect of a particular branch may only be stored until that branch is merged back into the main code base—and once the branch has been merged the code coverage information for the now merged branch may be deleted. Automatically deleting the code coverage information from the SCM system 150 assists in saving memory resources.

User Interface Generation and Examples

Figure 5:
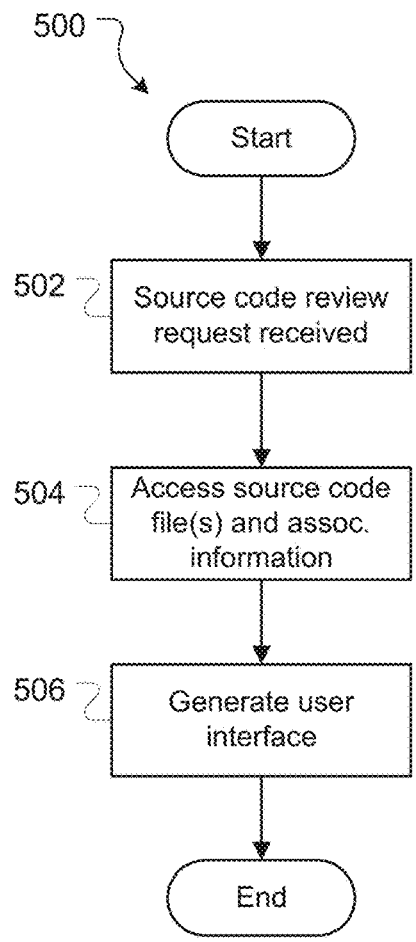
FIG. 5 is a flowchart indicating operations performed to generate a user interface including both source code and associate code coverage information in accordance with an embodiment.

Turning to FIG. 5, a process 500 for generating a user interface that includes both source code and associated code coverage information will be described.

At 502, a view source code request is initiated at the SCM client 122.

At 504, the SCM client 122 accesses the relevant source code file(s) and associated information. If the source code file(s) and associated information have previously been obtained from the SCM system 150 they may be accessed from local memory (e.g. memory 124). Conversely, the SCM client 122 may request the source code file(s) and associated information from the SCM system 150.

At 506, the SCM client 122 generates a user interface and displays it on a display (e.g. display 212). The user interface displays the source code and general information in respect of the source code (e.g. the name of the source code file, line numbers etc.). If the source code in question has associated code coverage information, the user interface also displays the code coverage information. In certain embodiments, any associated code coverage information is automatically displayed. In alternative embodiments, display of the code coverage information may be at the option of the user, controlled by a user interface control (e.g. a 'Display/hide code coverage information control which, when activated, toggles display of the code coverage information on and off).

Figure 6:
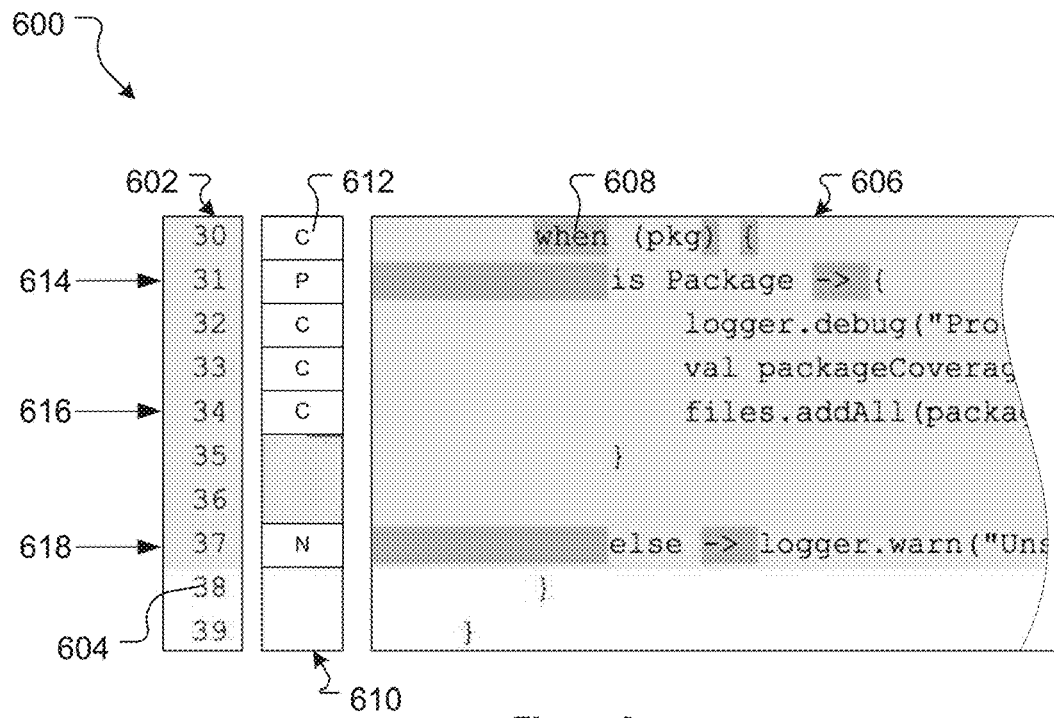
FIG. 6 is an example user interface in accordance with an embodiment.

The user interface generated at 506, and information/controls provided therein, may vary. By way of example, FIG. 6 provides one example of a partial user interface 600 which displays both source code and associated code coverage information.

User interface 600 includes a line number pane/section 602 in which source code line numbers 604 are displayed and a source code pane/section 606 (only part of which is shown) in which the source code lines 608 themselves are displayed.

Interface 600 further includes a code coverage pane/section 610 which includes code coverage indicators 612 in respect of relevant source code lines. Typically, relevant source code lines are all lines that define actual processing steps or operations (and thus exclude source code lines that are solely made up of opening/closing brackets/braces or non-executing comments).

Each code coverage indicator 612 is associated with source code line and indicates the code coverage test results in respect of that source code line. In the present embodiment, a given code coverage indicator may indicate that the associated source code line was covered by the test suite, not covered by the test suite, or partially covered by the test suite. This information is provided in a single interface and without requiring a user to switch between a code coverage test system and a SCM system.

Any appropriate visual technique may be used to distinguish these four different code coverage options from one another (i.e. covered, not covered, partially covered, not a relevant source code line). For example, in the illustrated embodiment: the letter "C" indicates a covered source code line; the letter "N" indicates a not covered source code line; the letter "P" indicates a partially covered source code line; and the absence of any letter (or other indicator) indicates a non-relevant source code line. As an alternative example, colours may be used to allow for quick and simply identification of code coverage status—for example: the colour green indicating a covered source code line; the colour red indicating a not covered source code line; the colour orange/amber indicating a partially covered source code line; and a background colour (e.g. white) indicating a non-relevant source code line. More generally, any appropriate mechanism may be used to indicate code coverage statuses, for example different: letters, words, symbols, colours, fill effects, other visual distinguishers, and/or combinations thereof.

As can be seen, interface 600 allows a user to immediately discern whether a given line of source code was covered by a test suite or not. For example: looking along the horizontal line indicated by arrow 614 shows that source code line 31 was partially covered by the test suite (per the 'P' code coverage indicator 612); looking along the horizontal line indicated by arrow 616 shows that source code line 34 was covered by the test suite (per the 'C' code coverage indicator 612); and looking along the horizontal line indicated by arrow 610 shows that source code line 37 was not covered by the test suite (per the 'N' code coverage indicator 612).

Figure 7:
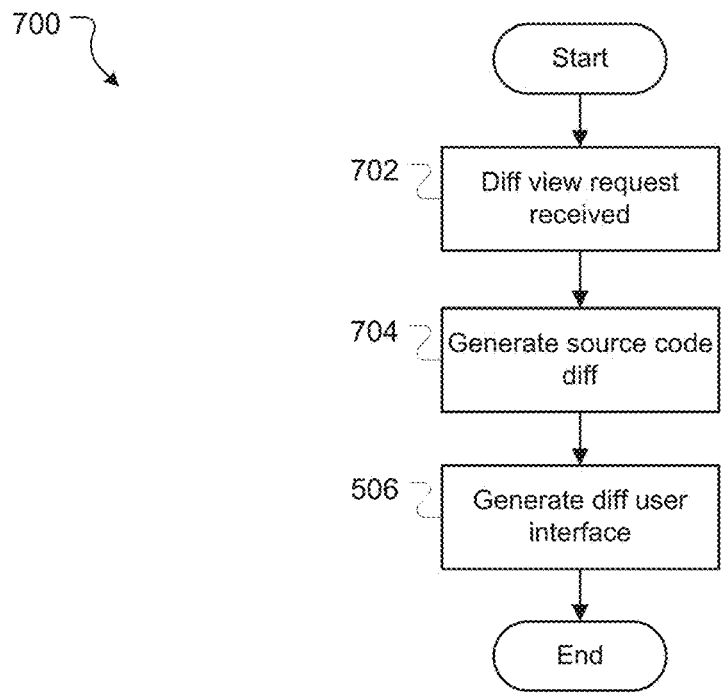
FIG. 7 is a flowchart indicating operations performed to generate a user interface including both source code and associate code coverage information in accordance with another embodiment.

Turning to FIG. 7, a further example process 700 for generating a user interface that includes both source code and associated code coverage information will be described. Process 700 differs to process 500 described above in that process 700 generates a source code diff view with associated code coverage information.

At 702, a diff view request is initiated at the SCM client 122. The diff view request is made in respect of two different versions of a source code base: an original version and a revised version. In some cases a user may manually specify the two versions, e.g. by reference to their appropriate SCM system identifiers (e.g. commit identifiers). In other cases, the relevant versions may automatically be identified by context. For example, if the user of the reviewer system 120 is reviewing a pull request that has been submitted, the pull request will already be associated with a current version of a code base (e.g. the current master branch of the source code base) and a revised version of the code base (e.g. the version associated with the pull request and which is being reviewed for merging into the current code base version).

At 704, the SCM client 122 accesses or generates a source code diff based on the original and revised source code base versions associated with the diff review request. The source code diff includes, at the very least, the revised version of the source code along with diff information showing how the original version of the source code base was changed to arrive at the revised version.

The source code diff can be generated in various ways, for example by use of the Git 'diff' command (where the SCM system 150 is a Git based SCM system) with appropriate arguments identifying the original and revised source code (e.g. commit identifiers). Furthermore, generation of the source code diff can be generated by different systems. For example, in certain embodiments, the source code diff may be generated by a SCM system client operating on an end-user system (e.g. SCM client 122 operating on reviewer system 120). Alternatively, the source code diff may be generated by a SCM server (e.g. server 152) and communicated to a SCM system client (e.g. client 122) for presentation to a user.

At 706, the SCM client 122 generates a diff user interface and displays it on a display (e.g. display 212). The diff user interface may present the diff and code coverage information in various ways and, as with process 500 described above, any code coverage information associated with the original and/or revised versions of the code may be automatically displayed or its display controlled by a suitable user interface control (e.g. a 'Display/hide code coverage information control).

Figure 8:
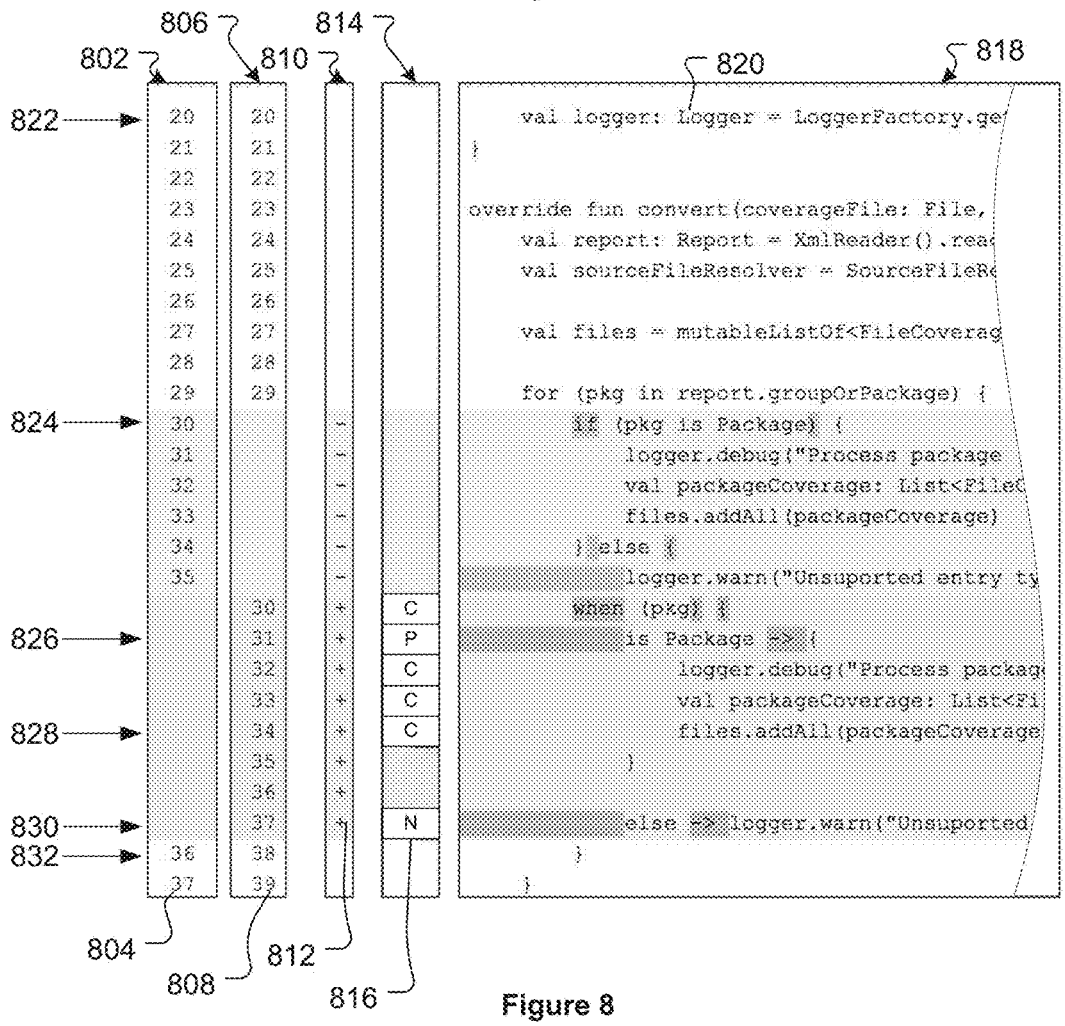
FIG. 8 is an example user interface in accordance with another embodiment.

By way of example, FIG. 8 provides one example of a partial user interface 800 which displays a diff view with associated code coverage information. User interface 800 includes an original version line number pane/section 802, a revised version line number pane/section 806, a revision indicator pane/section 810, a code coverage pane/section 814, and a source code pane/section 818 (only part of which is shown).

The original version line number pane/section 802 displays source code line numbers 804 from the original source code version. A blank original version line number indicates that the source code line was not present in the original version but is present in the final version (e.g. is a new source code line).

The revised version line number pane/section 806 displays source code line numbers 808 from the revised source code version. A blank revised version line number indicates that the source code line was present in the original version but is not present in the revised version (e.g. is a deleted source code line).

The revision indicator pane/section 810 provides revision indicators 812 which indicate whether a source code line is new (i.e. not in the original version but in the revised version), deleted (i.e. in the original version but not in the revised version), or unchanged (i.e. in both the original and revised versions). In the illustrated embodiment: a '+' symbol is used to indicate new source code lines; a '−' symbol is used to indicate deleted source code lines; and no symbol (i.e. blank) is used to indicate unchanged source code lines. Additional or alternative revision indicators may, however, be used. For example, in addition to (or instead of) the '+'/'−'/' ' symbols, colours may be used—e.g.: green highlighting/shading may be used to indicate new source code lines; red highlighting/shading may be used to indicate deleted source code lines; and no highlighting/shading may be used to indicate unchanged source code lines.

The code coverage pane/section 814 includes code coverage indicators 816 in respect of relevant source code lines. As with interface 600 described above, each code coverage indicator 816 is associated with source code line and indicates the code coverage test results in respect of that source code line. Once again, any appropriate visual indicators may be used, but in the illustrated embodiment: the letter "C" indicates a covered source code line; the letter "N" indicates a not covered source code line; the letter "P" indicates a partially covered source code line; and the absence of any letter (or other indicator) indicates a non-relevant source code line.

The source code pane/section 818 again displays source code lines 820.

Interface 800 allows a user to immediately discern whether a given line of source code is new or not and whether it was covered by a test suite or not. For example: looking along the horizontal line indicated by arrow 822 shows that source code line 20 in the original version is unchanged (per the absence of any revision indicator 812), and remains as line number 20 in the revised version; looking along the horizontal line indicated by arrow 824 shows that source code line 30 of the original version has been deleted (per '−' the revision indicator 812) and, as a deleted line, code coverage information is irrelevant; looking along the horizontal line indicated by arrow 826 shows that source code line 31 in the revised version is a new source code line (per the '+' revision indicator 812) and was partially covered by the test suite (per the 'P' code coverage indicator 816); looking along the horizontal line indicated by arrow 828 shows that source code line 34 in the revised version is a new source code line (per the '+' revision indicator 812) and was covered by the test suite (per the 'C' code coverage indicator 816); looking along the horizontal line indicated by arrow 830 shows that source code line 37 in the revised version is a new source code line (per the '+' revision indicator 812) and was not covered by the test suite (per the 'N' code coverage indicator 816); and looking along the horizontal line indicated by arrow 832 shows that source code line 36 in the original version is unchanged (per the absence of any revision indicator 812) but is line number 39 in the revised version.

In interface 800, code coverage indicators have not been displayed in respect of unchanged source code lines (for example lines 20 to 29). This can help to keep the reviewer focused on what changed in the code base and how well the changes were tested. In alternative embodiments, code coverage indicators could be displayed for unchanged source code lines.

In interfaces 600 and 800 the various panes/sections (e.g. line number, source code, code coverage, and revision status panes/sections) have been illustrated as separate sections with border lines and spacing between. In alternative embodiments the panes/sections of the interfaces do not include border lines or gaps between.

Furthermore, user interfaces 600 and 800 are partial user interfaces. Actual user interfaces would include additional information and controls, for example information in relation to the specific source code file being reviewed (e.g. name, path, project, version information etc.) and controls permitting (for example) navigation between and within source code files, amendment/editing controls, view option controls etc.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. A computer implemented method comprising:
 accessing code coverage information at a source code management system, the code coverage information describing units of a particular version of a particular source code base and, for each unit, a code coverage status indicating whether a test suite tested against the particular version of the particular source code base covered, did not cover, or partially covered the unit;
 associating the code coverage information with the particular version of the particular source code base, wherein associating the code coverage information with the particular version of the particular source code base comprises:
  for each unit described in the code coverage information:
   identifying the corresponding unit in the particular version of the particular source code base; and
   associating the code coverage status as described in the code coverage information with the corresponding unit identified;
 receiving a request to display a difference regarding the particular version of the particular source code base with respect to a previous version of the particular source code base; and in response to receiving the request:
  generating diff information based on the particular version and the previous version;
  generating user interface information, the user interface information comprising:
    a source code pane showing a differential view computed based on the diff information and comprising units of the particular source code base and the previous version of the particular source code base;
    a revision indicator pane generated using the diff information and comprising a set of revision indicator symbols, each revision indicator symbol in the set of revision indicator symbols corresponding to a unit of the particular source code base of the differential view; and
    a code coverage pane, showing a set of code coverage indicators, each code coverage indicator in the set of code coverage indicators corresponding to a unit of the particular source code base in the differential view; and
  causing the user interface information to be displayed on a display.

2. The computer implemented method of claim 1, wherein accessing code coverage information comprises receiving code coverage information from a code coverage module, the code coverage module generating the code coverage information based on raw code coverage results generated by a code coverage tool.

3. The computer implemented method of claim 1, wherein accessing code coverage information comprises:
  receiving raw code coverage test results from a code coverage tool; and
  processing the raw code coverage test results to generate the code coverage information.

4. The computer implemented method of claim 1, wherein each code coverage indicator in the set of code coverage indicators comprises one of: a covered indicator; a partially covered indicator; and a not covered indicator.

5. The computer implemented method of claim 1, wherein each revision indicator symbol in the set of revision indicator symbols comprises one of: a new indicator, indicating the unit is new in the particular version of the particular source code base; a deleted indicator, indicating that the unit was deleted from the previous version of the particular source code base; and an unchanged indicator, indicating that the unit was substantively unchanged from the previous version of the particular source code base.

6. The computer implemented method of claim 1, wherein the code coverage indicator is one of: a covered indicator; a partially covered indicator; and a not covered indicator.

7. The computer implemented method of claim 1, further comprising:
  receiving an indication that one or more units of the particular version of the particular source code base are deleted from a source code manager system;
  in response to receiving the indication, automatically deleting code coverage information associated with the one or more units deleted from the source code manager system;
  wherein the code coverage information is stored at the source code manager system.

8. The computer implemented method of claim 1, wherein the user interface information further comprises:
  a first line number pane showing a first set of source codes line numbers, each source code line number in the first set of source code line numbers corresponding to a unit of the particular source code base included in the previous version of the particular source code base; and
  a second line number pane showing a second set of source code line numbers, each source code line number in the second set of source code line numbers corresponding to a unit of the particular source code base included in the particular version of the particular source code base.

9. A system comprising:
  a processor,
  a communication interface, and
  a non-transitory computer-readable storage medium storing sequences of instructions, which when executed by the processor, cause the processor to:
    access code coverage information at a source code management system, the code coverage information describing units of a particular version of a particular source code base and, for each unit, a code coverage status indicating whether a test suite tested against the particular version of the particular source code base covered, did not cover, or partially covered the unit;
    associate the code coverage information with the particular version of the particular source code base, wherein associating the code coverage information with the particular version of the particular source code base comprises:
      for each unit described in the code coverage information:
        identifying the corresponding unit in the particular version of the particular source code base; and
        associating the code coverage status as described in the code coverage information with the corresponding unit identified;
    receiving a request to display a difference regarding the particular version of the particular source code base with respect to a previous version of the particular source code base; and
    in response to receiving the request:
      generating diff information based on the particular version and the previous version;
      generating user interface information, the user interface information comprising:
        a source code pane showing a differential view computed based on the diff information and comprising units of the particular source code base and the previous version of the particular source code base;
        a revision indicator pane generated using the diff information and comprising a set of revision indicator symbols, each revision indicator symbol in the set of revision indicator symbols corresponding to a unit of the particular source code base in the differential view; and
        a code coverage pane, showing a set of code coverage indicators, each code coverage indicator in the set of code coverage indicators corresponding to a unit of the particular source code base in the differential view; and
      causing the user interface information to be displayed on a display.

10. The system of claim 9, wherein accessing code coverage information comprises receiving, via the communication interface, code coverage information from a code coverage module, the code coverage module generating the code coverage information based on raw code coverage results generated by a code coverage tool.

11. The system of claim 10, wherein accessing code coverage information comprises:
receiving, via the communication interface, raw code coverage test results from the code coverage tool; and
processing, by the processor, the raw code coverage test results to generate the code coverage information.

12. The system of claim 9, wherein each code coverage indicator in the set of code coverage indicators comprises one of: a covered indicator; a partially covered indicator; and a not covered indicator.

13. The system of claim 9, wherein each revision indicator symbol in the set of revision indicator symbols comprises one of: a new indicator, indicating the unit is new in the particular version of the particular source code base; a deleted indicator, indicating that the unit was deleted from the previous version of the particular source code base; and an unchanged indicator, indicating that the unit was substantively unchanged from the previous version of the particular source code base.

14. The system of claim 9, wherein the code coverage indicator is one of: a covered indicator; a partially covered indicator; and a not covered indicator.

15. The system of claim 9, wherein when executed by the processor, the sequences of instructions further cause the processor to:
receive an indication that one or more units of the particular version of the particular source code base are deleted from a source code manager system;
in response to receiving the indication, automatically delete code coverage information associated with the one or more units deleted from the source code manager system;
wherein the code coverage information is stored at the source code manager system.

16. The system of claim 9, wherein the user interface information further comprises:
a first line number pane showing a first set of source codes line numbers, each source code line number in the first set of source code line numbers corresponding to a unit of the particular source code base included in the previous version of the particular source code base; and
a second line number pane showing a second set of source code line numbers, each source code line number in the second set of source code line numbers corresponding to a unit of the particular source code base included in the particular version of the particular source code base.

17. Non-transient computer readable storage comprising instructions which, when executed by a processor, cause the processor to:
access code coverage information at a source code management system, the code coverage information describing units of a particular version of a particular source code base and, for each unit, a code coverage status indicating whether a test suite tested against the particular version of the particular source code base covered, did not cover, or partially covered the unit;
associate the code coverage information with the particular version of the particular source code base, wherein associating the code coverage information with the particular version of the particular source code base comprises:
for each unit described in the code coverage information:
identifying the corresponding unit in the particular version of the particular source code base; and
associating the code coverage status as described in the code coverage information with the corresponding unit identified
receiving a request to display a difference regarding the particular version of the particular source code base with respect to a previous version of the particular source code base; and
in response to receiving the request:
generating diff information based on the particular version and the previous version;
generating user interface information, the user interface information comprising:
a source code pane showing a differential view computed based on the diff information and comprising units of the particular source code base and the previous version of the particular source code base;
a revision indicator pane generated using the diff information and comprising a set of revision indicator symbols, each revision indicator symbol in the set of revision indicator symbols corresponding to a unit of the particular source code base of the differential view; and
a code coverage pane, showing a set of code coverage indicators, each code coverage indicator in the set of code coverage indicators corresponding to a unit of the particular source code base in the differential view; and
causing the user interface information to be displayed on a display.

18. The non-transient computer readable storage system of claim 17, wherein accessing code coverage information comprises:
receiving, via a communication interface, raw code coverage test results from a code coverage tool; and
processing, by the processor, the raw code coverage test results to generate the code coverage information.

19. The non-transient computer readable storage system of claim 17, wherein the user interface information further comprises:
a first line number pane showing a first set of source codes line numbers, each source code line number in the first set of source code line numbers corresponding to a unit of the particular source code base included in the previous version of the particular source code base; and
a second line number pane showing a second set of source code line numbers, each source code line number in the second set of source code line numbers corresponding to a unit of the particular source code base included in the particular version of the particular source code base.

* * * * *